US008319842B2

(12) United States Patent
Shibata (10) Patent No.: US 8,319,842 B2
(45) Date of Patent: Nov. 27, 2012

(54) IMAGE CAPTURING APPARATUS TO PREVENT IMAGE BLURRING AND CONTROL METHOD THEREFOR

(75) Inventor: Masahiro Shibata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 12/267,940

(22) Filed: Nov. 10, 2008

(65) Prior Publication Data

US 2009/0153680 A1    Jun. 18, 2009

(30) Foreign Application Priority Data

Dec. 13, 2007    (JP) ................................. 2007-322545

(51) Int. Cl.
*H04N 5/228*    (2006.01)
*G03B 17/00*    (2006.01)
(52) U.S. Cl. ...................................... 348/208.6; 396/55
(58) Field of Classification Search .............. 348/208.1, 348/208.6, 208.99, 208.4
See application file for complete search history.

(56) References Cited

U.S. PATENT DOCUMENTS

| 5,237,405 | A | * | 8/1993 | Egusa et al. | 348/208.1 |
| 5,563,652 | A | * | 10/1996 | Toba et al. | 348/207.99 |
| 5,648,815 | A | * | 7/1997 | Toba | 348/207.99 |
| 5,748,231 | A | * | 5/1998 | Park et al. | 348/207.99 |
| 5,905,527 | A | | 5/1999 | Inou et al. | |
| 5,909,242 | A | * | 6/1999 | Kobayashi et al. | 348/208.3 |
| 5,926,212 | A | * | 7/1999 | Kondo | 348/207.99 |
| 6,144,405 | A | * | 11/2000 | Toba | 348/208.4 |
| 7,605,845 | B2 | * | 10/2009 | Batur | 348/208.6 |
| 7,649,549 | B2 | * | 1/2010 | Batur | 348/208.6 |
| 7,852,375 | B2 | * | 12/2010 | Vella et al. | 348/208.99 |
| 2009/0310876 | A1 | * | 12/2009 | Nishi et al. | 382/236 |
| 2010/0020244 | A1 | * | 1/2010 | Mitsuya et al. | 348/699 |

FOREIGN PATENT DOCUMENTS

| JP | 03-198488 A |   | 8/1991 |
| JP | 06-203164 |   | 7/1994 |
| JP | 08163573 A | * | 6/1996 |
| JP | 2002016834 A | * | 1/2002 |
| JP | 2005-203934 A |   | 7/2005 |
| JP | 2006-074261 A |   | 3/2006 |

OTHER PUBLICATIONS vol. 17, No. 7, pp. 634-640. Information Processing Society of Japan, Jul. 1976, Image Registration by the Sequential Similarity Detection Algorithm, Morio Onoe, Norihiko Maeda, Masaru Saito (Full English Translation).

* cited by examiner

*Primary Examiner* — John Villecco
(74) *Attorney, Agent, or Firm* — Cowan, Liebowitz & Latman, P.C.

(57) ABSTRACT

An image capturing apparatus includes a motion vector detection unit which detects a motion vector on the basis of the correlation between image signals continuously captured by an image capturing unit, a reliability evaluation value calculation unit which calculates the reliability evaluation value of the motion vector detected by the motion vector detection unit, a blurring correction amount determination unit which determines the image blurring correction amount on the basis of the motion vector detected by the motion vector detection unit, a correction amount reduction unit which reduces the image blurring correction amount on the basis of the reliability evaluation value calculated by the reliability evaluation value calculation unit, and a blurring correction unit which corrects image blurring on the basis of the image blurring correction amount reduced by the correction amount reduction unit.

14 Claims, 9 Drawing Sheets

IMAGE CAPTURING APPARATUS TO PREVENT IMAGE BLURRING AND CONTROL METHOD THEREFOR

BACKGROUND OF THE INVENTION

1. Field of the Invention

The present invention relates to a technique of detecting the motion vector of a moving image to correct blurring of the moving image.

2. Description of the Related Art

An image capturing apparatus such as a video camera which captures a moving image suffers image blurring owing to camera shake when the lens zooms to the telephoto end. To prevent image blurring caused by camera shake, there has conventionally been proposed a technique of detecting the motion vector of an image from a captured image signal and correcting image blurring on the basis of the motion vector.

Known examples of the conventional method of detecting the motion vector of a moving image are a correlation method based on correlation calculation, and block matching.

According to block matching, an input image signal is divided into a plurality of blocks (e.g., eight pixels×eight lines) of a proper size. Differences from pixels in a predetermined range of a preceding field (or frame) are calculated for each block. A block of a preceding field (or frame) in which the sum of the absolute values of the differences becomes minimum is searched for. The relative shift between frames represents the motion vector of the block.

Matching calculation is discussed in detail in Morio Onoe, et al., "Information Processing", Vol. 17, No. 7, pp. 634-640, July 1976.

Figure 6:
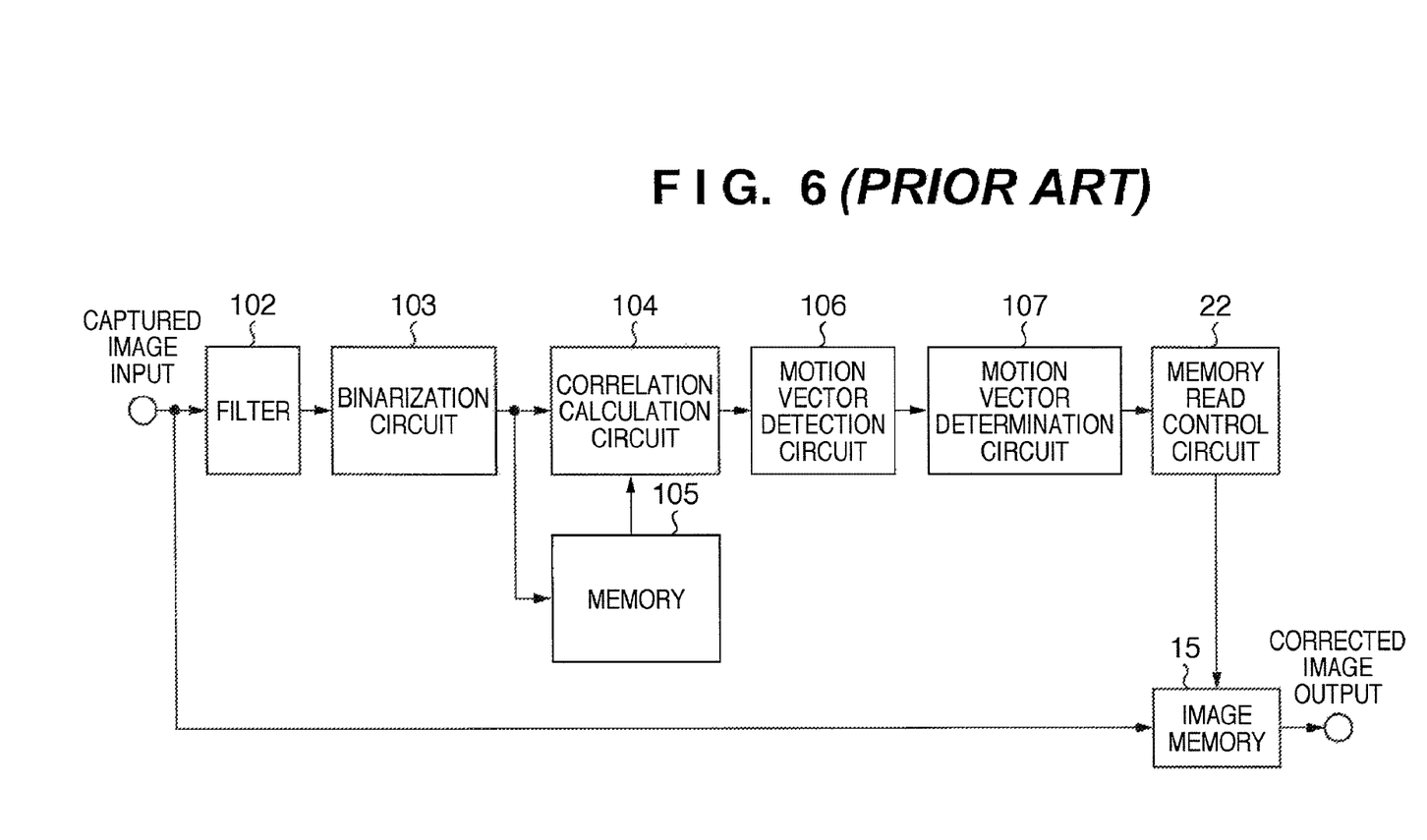
FIG. 6 is a block diagram of a conventional image blurring correction system.

An example of a conventional motion vector detection method using block matching will be explained with reference to FIG. 6. FIG. 6 is a schematic block diagram of an apparatus which prevents blurring according to a conventional motion vector detection method.

An image signal (field or frame) subjected to motion vector detection is input to an image memory 15 and a filter 102 for extracting the spatial frequency. The image memory 15 temporarily stores the image signal. The filter 102 extracts, from the image signal, a spatial frequency component useful for motion vector detection. That is, the filter 102 removes the low and high spatial frequency components of the image signal.

The image signal having passed through the filter 102 is input to a binarization circuit 103. The binarization circuit 103 binarizes the image signal using zero level as a reference. More specifically, the binarization circuit 103 outputs the sign bit of the output signal.

The binary image signal is input to a correlation calculation circuit 104 and a memory 105 serving as a 1-field period delay means. The correlation calculation circuit 104 further receives an image signal of a preceding field from the memory 105.

The correlation calculation circuit 104 calculates the correlation between the current and preceding fields for each block according to block matching, and outputs the resultant correlation value to a motion vector detection circuit 106. The motion vector detection circuit 106 detects the motion vector of each block from the correlation value. More specifically, the motion vector detection circuit 106 searches for a block of a preceding field having a minimum correlation value. The motion vector detection circuit 106 detects the relative shift between the blocks of the current and preceding fields as a motion vector.

The motion vector of each block is input to a motion vector determination circuit 107. The motion vector determination circuit 107 determines the motion vector of an entire image from the motion vectors of respective blocks. More specifically, the motion vector determination circuit 107 determines the median or average of motion vectors of respective blocks as the motion vector of the entire image. At this time, the motion vector determination circuit 107 evaluates the motion vector of each block on the basis of the correlation value, determining whether the motion vector of the block is valid/invalid. By determining the number of valid/invalid motion vectors, the reliability of the motion vector can be evaluated.

The motion vector determination circuit 107 outputs the motion vector of the entire image to a memory read control circuit 22. The memory read control circuit 22 controls the read position in the image memory 15 so as to cancel image blurring in accordance with the motion vector of the entire image. Then, the image memory 15 outputs a blurring-corrected image signal.

Figure 7:
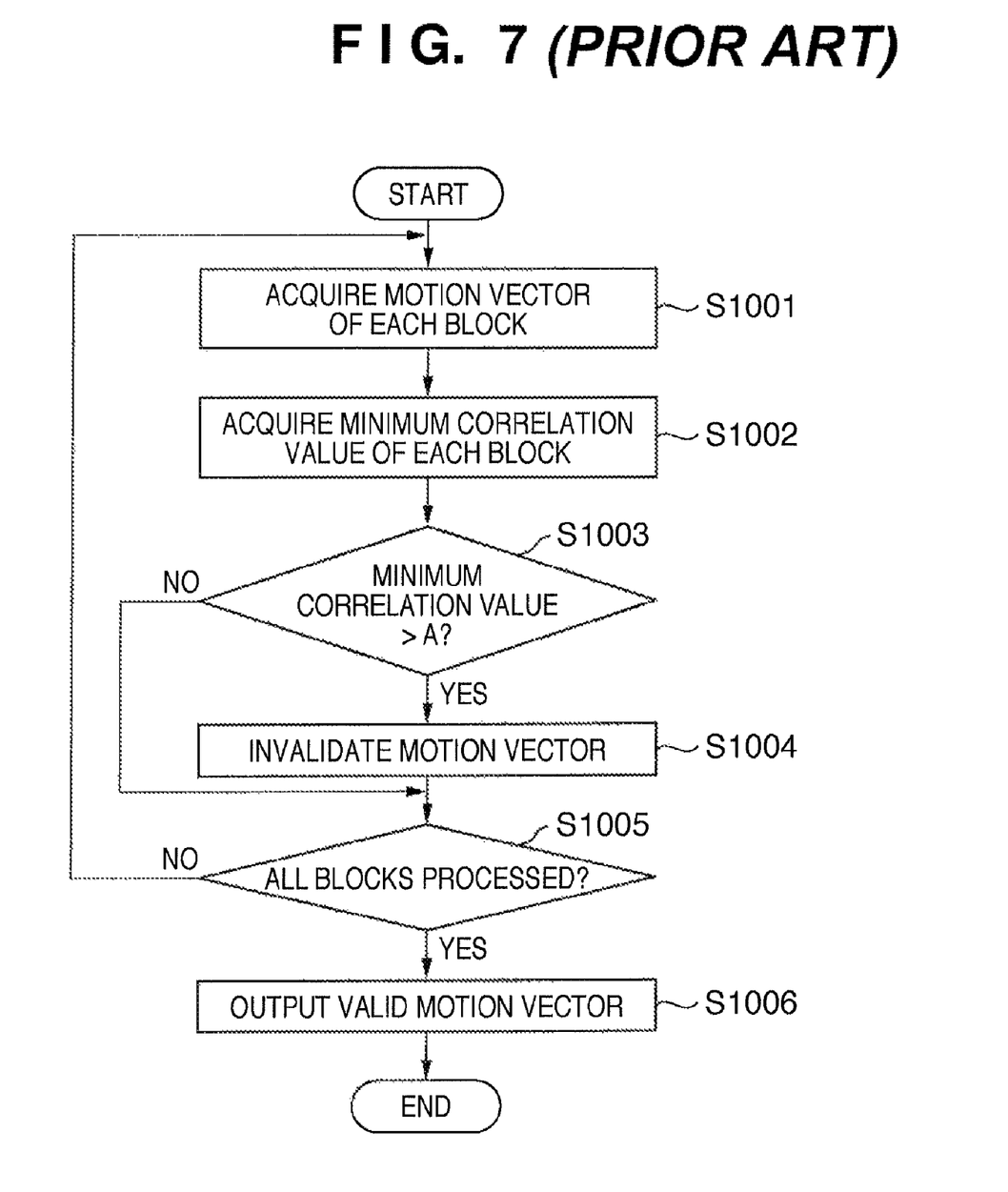
FIG. 7 is a flowchart for explaining a conventional motion vector evaluation method.

A motion vector evaluation method will be explained. FIG. 7 is a flowchart for explaining the motion vector evaluation method.

In step S1001, the motion vector of each block is acquired. In step S1002, the minimum value of the correlation value of each block is acquired. In step S1003, it is determined whether the minimum value of the correlation value acquired in step S1002 is larger than an arbitrary constant A. If it is determined in step S1003 that the minimum value is larger than A, the process advances to step S1004. If it is determined in step S1003 that the minimum value is equal to or smaller than A, the process advances to step S1005. In step S1004, the motion vector of the target block is invalidated. In step S1005, it is determined whether all blocks have been processed. If not all blocks have been processed, the process shifts to the next block and is repeated from step S1001. If all blocks have been processed, the process advances to step S1006. In step S1006, a valid motion vector is output.

Japanese Patent Laid-Open No. 6-203164 proposes a method of increasing the motion vector detection precision by evaluating the reliability of the motion vector in a system which corrects image blurring by detecting the motion vector of an image.

However, according to the conventional technique, if it is determined that the number of valid motion vectors is smaller than a predetermined value, i.e., the reliability of detected motion vectors is poor, the motion vectors are invalidated not to execute blurring correction. At this time, the motion vector reliability is influenced by the image state. That is, a motion vector of high reliability can be detected from a high-contrast image for which matching is uniquely determined. However, when an image has few characteristic patterns or includes many similar features, a motion vector of low reliability is detected.

Even while the same object is captured, the motion vector reliability always changes owing to the image flow caused by camera shake, the out-of-focus state upon moving the focus, or the like. If execution/non-execution of blurring correction is simply determined in accordance with the motion vector reliability, execution and non-execution of blurring correction are continuously repeated, resulting in a discontinuous anti-shake effect.

SUMMARY OF THE INVENTION

The present invention has been made to overcome the conventional drawbacks, and has as its object to suppress the discontinuity of the blurring correction effect in a moving image.

To solve the above-described problems and achieve the above-described object, according to the first aspect of the present invention, there is provided an image capturing apparatus comprising an image capturing unit which captures an object image formed by an imaging optical system and outputs an image signal, a motion vector detection unit which detects a motion vector on the basis of correlation between image signals continuously captured by the image capturing unit, a reliability evaluation value calculation unit which calculates a reliability evaluation value of the motion vector detected by the motion vector detection unit, a blurring correction amount determination unit which determines an image blurring correction amount on the basis of the motion vector detected by the motion vector detection unit, a correction amount reduction unit which reduces the image blurring correction amount in accordance with a reduction rate determined based on the reliability evaluation value calculated by the reliability evaluation value calculation unit, and a blurring correction unit which corrects image blurring on the basis of the image blurring correction amount reduced by the correction amount reduction unit.

According to the second aspect of the present invention, there is provided an image capturing apparatus comprising an image capturing unit which captures an object image formed by an imaging optical system capable of zooming, and outputs an image signal, a motion vector detection unit which detects a motion vector on the basis of correlation between image signals continuously captured by the image capturing unit, a reliability evaluation value calculation unit which calculates a reliability evaluation value of the motion vector detected by the motion vector detection unit, a blurring correction amount determination unit which determines an image blurring correction amount on the basis of the motion vector detected by the motion vector detection unit, a correction amount reduction unit which reduces the image blurring correction amount in accordance with a reduction rate determined based on the reliability evaluation value calculated by the reliability evaluation value calculation unit and a zoom position of the imaging optical system, and a blurring correction unit which corrects image blurring on the basis of the image blurring correction amount reduced by the correction amount reduction unit.

According to the third aspect of the present invention, there is provided a method of controlling an image capturing apparatus having an image capturing unit which captures an object image formed by an imaging optical system and outputs an image signal, the method comprising a motion vector detection step of detecting a motion vector on the basis of correlation between image signals continuously captured by the image capturing unit, a reliability evaluation value calculation step of calculating a reliability evaluation value of the motion vector detected in the motion vector detection step, a blurring correction amount determination step of determining an image blurring correction amount on the basis of the motion vector detected in the motion vector detection step, a correction amount reduction step of reducing the image blurring correction amount in accordance with a reduction rate determined based on the reliability evaluation value calculated in the reliability evaluation value calculation step, and a blurring correction step of correcting image blurring on the basis of the image blurring correction amount reduced in the correction amount reduction step.

According to the fourth aspect of the present invention, there is provided a method of controlling an image capturing apparatus having an image capturing unit which captures an object image formed by an imaging optical system capable of zooming, and outputs an image signal, the method comprising a motion vector detection step of detecting a motion vector on the basis of correlation between image signals continuously captured by the image capturing unit, a reliability evaluation value calculation step of calculating a reliability evaluation value of the motion vector detected in the motion vector detection step, a blurring correction amount determination step of determining an image blurring correction amount on the basis of the motion vector detected in the motion vector detection step, a correction amount reduction step of reducing the image blurring correction amount in accordance with a reduction rate determined based on the reliability evaluation value calculated in the reliability evaluation value calculation step and a zoom position of the imaging optical system, and a blurring correction step of correcting image blurring on the basis of the image blurring correction amount reduced in the correction amount reduction step.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings.

First Embodiment

Figure 1:
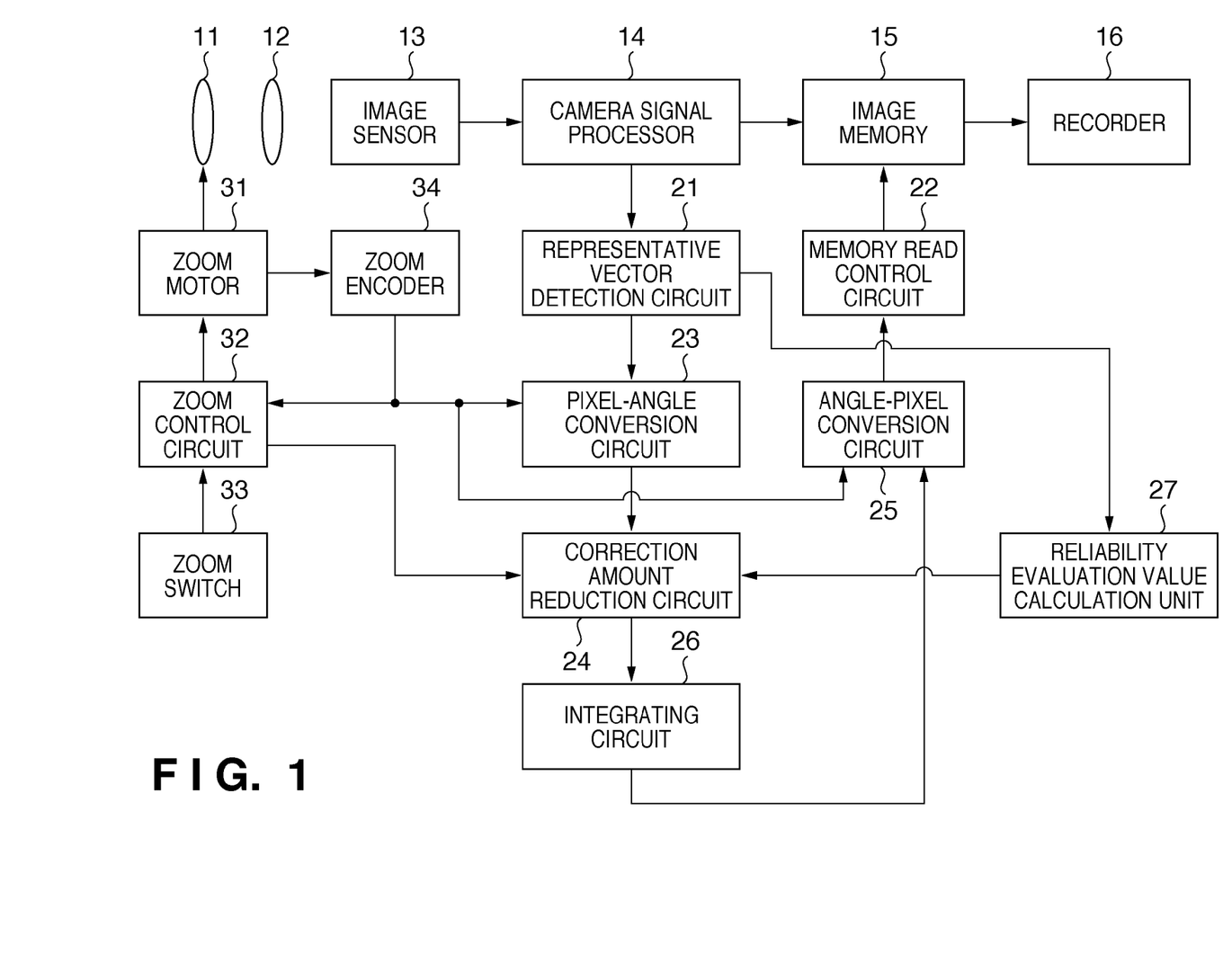
FIG. 1 is a block diagram showing the system configuration of an image capturing apparatus which incorporates an image blurring correction apparatus according to the first embodiment of the present invention.

FIG. 1 is a block diagram showing the system configuration of an image capturing apparatus which incorporates an image blurring correction apparatus according to the first embodiment of the present invention.

In FIG. 1, a zoom lens unit 11 zooms by changing the focal length. A focus lens unit 12 has a focus adjustment function and a so-called compensation function of correcting the movement of the focal plane upon zooming. In other words, the zoom lens unit 11 and focus lens unit 12 form an imaging optical system which forms an object image and can zoom. An image sensor 13 is formed from a CCD, CMOS sensor, or the like. A camera signal processor 14 includes analog and digital signal processing circuits. The analog signal processing circuit performs predetermined processing for a signal obtained by the image sensor 13, generating an analog image signal. The analog signal processing circuit is made up of a CDS (Co-related Double Sampling) circuit, AGC (Automatic Gain Control) circuit, and the like. The digital signal processing circuit converts an analog image signal into a digital image signal by an A/D converter, and generates a digital image signal having undergone predetermined signal processes such as gamma correction and white balance adjustment. An image memory 15 stores image data having undergone signal processing. A recorder 16 includes a recording device which records a video signal on a recording medium (e.g., a memory card, hard disk, DVD, or magnetic tape), a display unit which outputs and displays a video signal on a display device (liquid crystal panel or viewfinder), and a control circuit for them.

A representative vector detection circuit 21 detects a representative motion vector from image data having undergone signal processing by the camera signal processor 14. A representative motion detection vector detected and determined by the representative vector detection circuit 21 is determined as a correction amount used to correct image blurring (correction amount determination). A pixel-angle conversion circuit 23 converts a detected motion vector from the pixel unit into the angle unit. The motion vector in the pixel unit is converted into that in the angle unit because the motion vector in the angle unit is suited to correct the correction amount in consideration of zoom information.

A reliability evaluation value calculation unit 27 receives, from the representative vector detection circuit, information about the process up to determining a representative motion vector, and calculates the reliability evaluation value of the motion vector. A concrete method of calculating the reliability evaluation value will be described later.

A correction amount reduction circuit 24 reduces the image blurring correction amount calculated via the representative vector detection circuit 21 and pixel-angle conversion circuit in accordance with a reduction rate determined from the reliability evaluation value calculated by the reliability evaluation value calculation unit 27. An integrating circuit 26 integrates the correction amount output from the correction amount reduction circuit 24. An angle-pixel conversion circuit 25 converts the correction amount from the angle unit into the pixel unit on the basis of a signal from the integrating circuit 26. A memory read control circuit 22 controls to determine the image data range to be recorded or displayed on the basis of the correction amount output from the angle-pixel conversion circuit 25. Image data is cut out by only the range determined by the memory read control circuit 22, and output from the image memory 15 to the recorder 16.

A zoom switch 33 is used to zoom by changing the focal length. A zoom control circuit 32 performs zoom control on the basis of the zoom switch 33. A zoom motor 31 drives the zoom lens unit (zoom lens) 11 on the basis of an output from the zoom control circuit 32. A zoom encoder 34 detects the position of the zoom lens.

The motion vector detection method will be explained.

Figure 2:
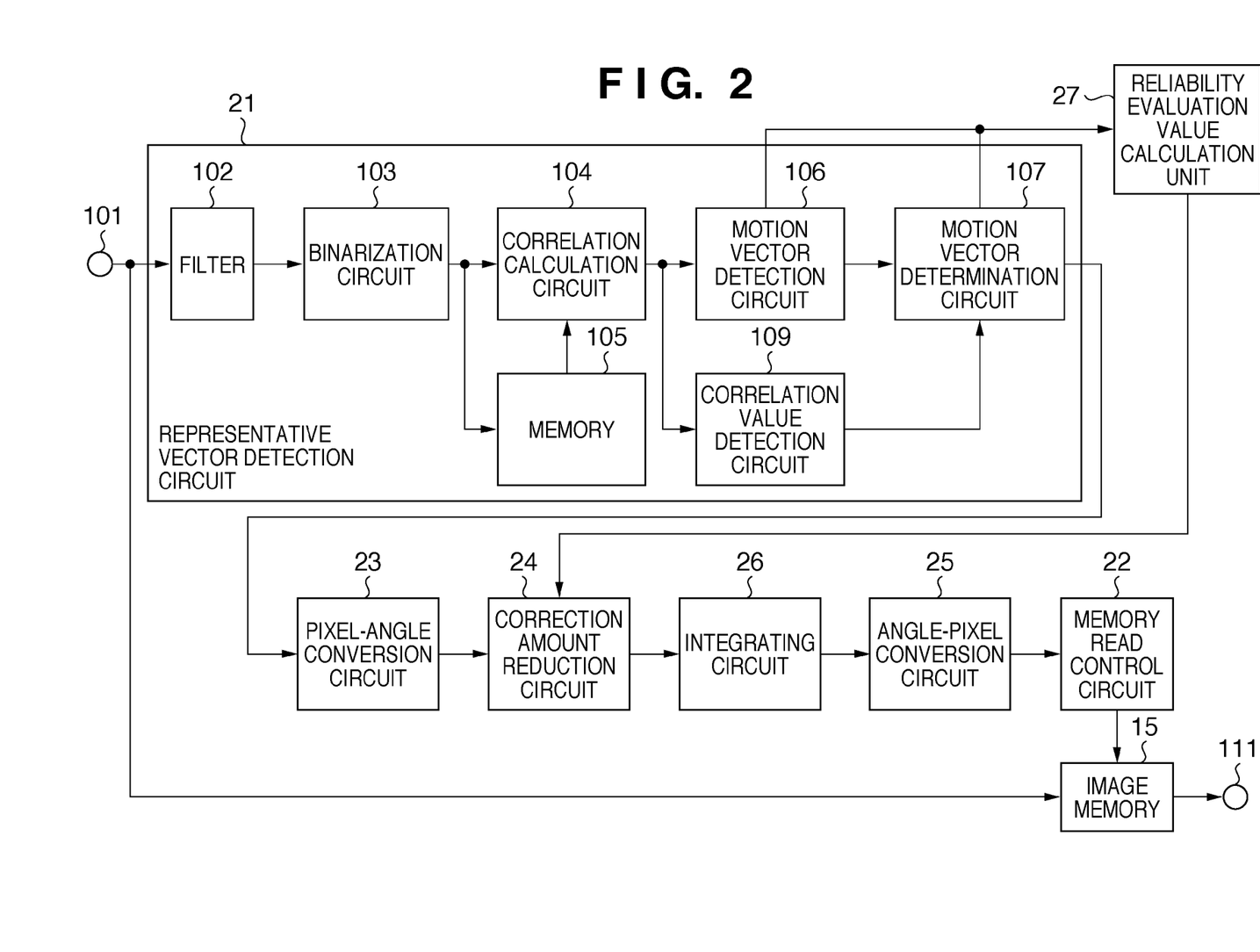
FIG. 2 is a block diagram showing the schematic arrangement of a representative vector detection circuit and its peripheral according to the first embodiment of the present invention.

FIG. 2 is a block diagram showing the schematic arrangement of the representative vector detection circuit 21 and its peripheral. The same reference numerals as those in FIG. 6 denote the same parts.

An image signal (field or frame) subjected to motion vector detection is input from an input terminal 101 to the image memory 15 and a filter 102 for extracting the spatial frequency. The image memory 15 temporarily stores the image signal. The filter 102 extracts, from the image signal, a spatial frequency component useful for motion vector detection. That is, the filter 102 removes the low and high spatial frequency components of the image signal.

The image signal having passed through the filter 102 is input to a binarization circuit 103. The binarization circuit 103 binarizes the image signal using zero level as a reference. More specifically, the binarization circuit 103 outputs the sign bit of the output signal. The binary image signal is input to a correlation calculation circuit 104 and a memory 105 serving as a 1-field period delay means. The correlation calculation circuit 104 further receives an image signal of a preceding field from the memory 105.

The correlation calculation circuit 104 calculates the correlation between the current and preceding fields (image signals) for each block according to block matching, and outputs the resultant correlation value to a motion vector detection circuit 106 and correlation value detection circuit 109. The motion vector detection circuit 106 detects the motion vector of each block from the correlation value. More specifically, the motion vector detection circuit 106 searches for a block of a preceding field having a minimum correlation value. The motion vector detection circuit 106 detects the relative shift as a motion vector. The motion vector of each block is input to a motion vector determination circuit 107.

The correlation value detection circuit 109 detects a minimum value among correlation values, and outputs it to the motion vector determination circuit 107. The motion vector determination circuit 107 evaluates the motion vector of each block in accordance with the minimum value detected by the correlation value detection circuit 109, and determines the motion vector of the entire image. More specifically, the motion vector determination circuit 107 determines the median or average of motion vectors of respective blocks as the motion vector of the entire image. The motion vector of the entire image is defined as the representative motion vector of an input image, and is determined as a correction amount used to correct image blurring. The correction amount is not directly used to control the read position in the image memory 15, but is converted and corrected through the following processing.

The reliability evaluation value calculation unit 27 receives pieces of detection and determination process information from the motion vector detection circuit 106 and motion vector determination circuit 107, and calculates the reliability evaluation value of the motion vector. The correction amount reduction circuit 24 reduces a correction amount converted into the angle unit by the pixel-angle conversion circuit 23, by multiplying the correction amount by a reduction rate determined from the reliability evaluation value obtained from the reliability evaluation value calculation unit 27.

The integrating circuit 26 integrates the correction amount reduced by the correction amount reduction circuit 24, converting the correction amount into an integrated one. The memory read control circuit 22 controls the read position in the image memory 15 so as to cancel image blurring in accordance with the correction amount obtained by converting the integrated correction amount into the pixel unit by the angle-pixel conversion circuit 25. Then, the image memory 15 outputs a blurring-corrected image signal.

A motion vector evaluation method by the reliability evaluation value calculation unit 27 will be explained.

The motion vector evaluation method can be achieved by the same processing as that of FIG. 7 described as the conventional technique. A correlation value evaluation method can also use the difference value between maximum and minimum values or the average correlation. The evaluation method is arbitrary as long as whether the motion vector is valid or invalid can be evaluated.

Calculation of the reliability evaluation value of the motion vector in the reliability evaluation value calculation unit 27 will be explained by exemplifying FIGS. 3A to 3D

Figure 3A:
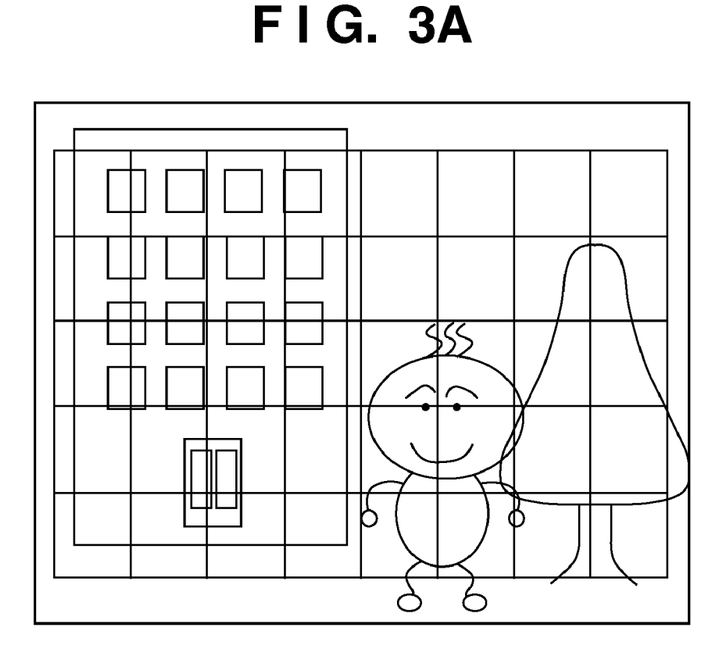
FIG. 3A is an explanatory view of the motion vector reliability.
Figure 3B:
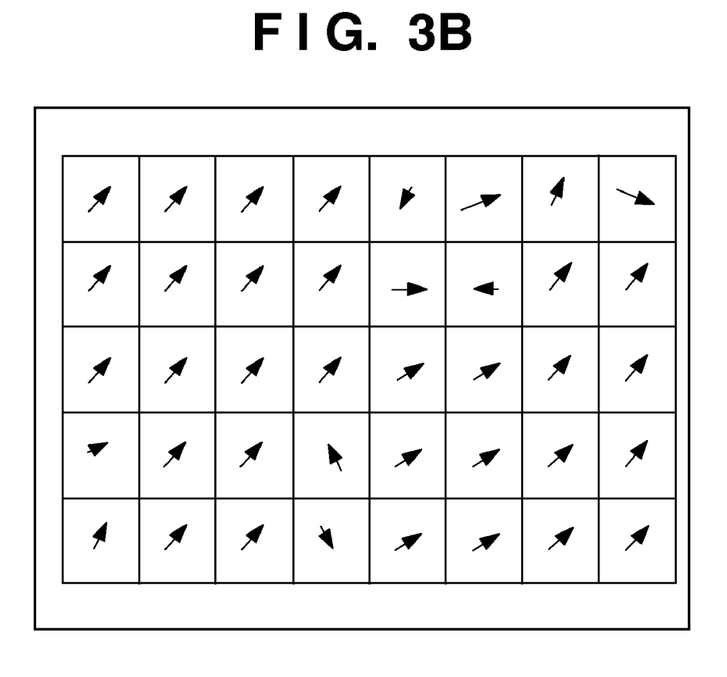
FIG. 3B is an explanatory view of the motion vector reliability.
Figure 3C:
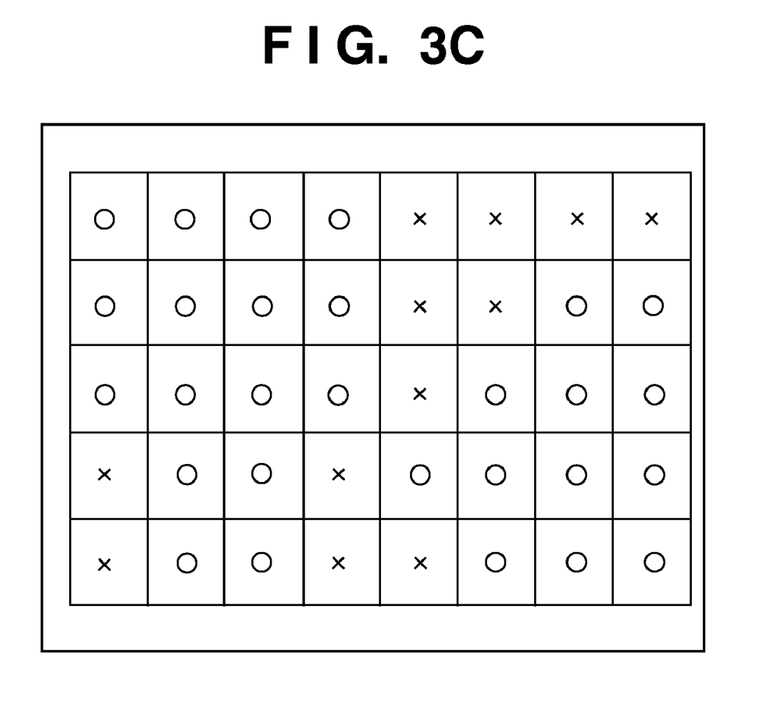
FIG. 3C is an explanatory view of the motion vector reliability.
Figure 3D:
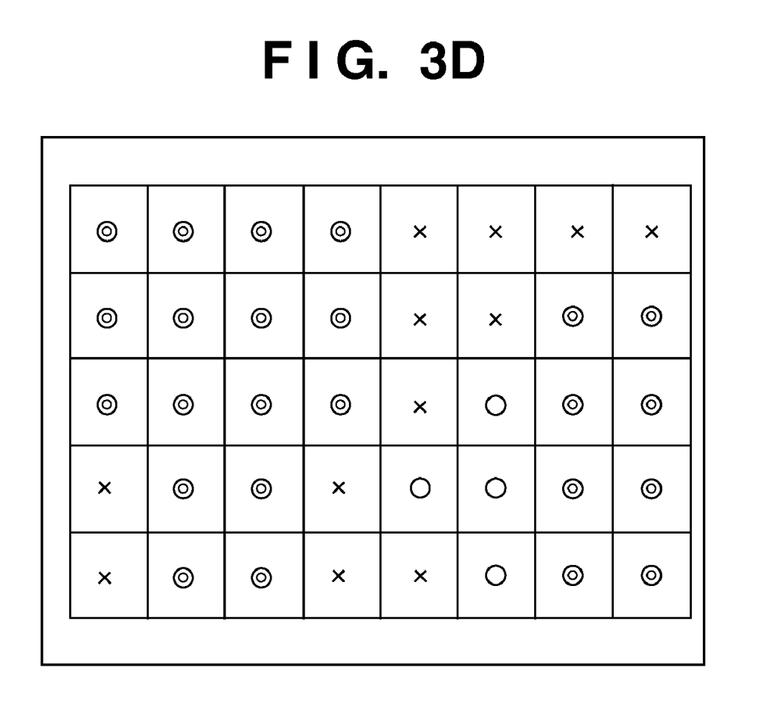
FIG. 3D is an explanatory view of the motion vector reliability.

FIG. 3A shows an image obtained by photographing a given object. In this case, 8×5 squares displayed in the image are respective blocks for detecting motion vectors, and the total number of blocks is 40. FIG. 3B shows an example of the result of detecting the motion vector of each block at a given timing while the image in FIG. 3A is captured. FIG. 3C shows an example of representing whether the motion vector of each block is valid (○)/invalid (x). FIG. 3D shows an example in which ⊚ represents a block whose motion vector matches the determined motion vector of the entire image in the result of FIG. 3C.

Valid motion vectors with high reliability are detected from a high-contrast portion and clear pattern portion such as the window frame of a building and a tree. To the contrary, invalid vectors with low reliability are detected from a low-contrast portion and a portion containing few patterns, such as the sky and the wall of a building. In this case, 28 blocks exhibit valid vectors, and 12 blocks exhibit invalid vectors. Since a moving portion such as a human has high contrast, it is determined from the correlation value that the motion vector of the moving portion is valid. However, the detected motion vector contains even the motion of an object together with camera shake. That is, valid motion vectors include motion vectors which detect only camera shake, and motion vectors which detect even the motion of an object at the same time as camera shake. From this, one motion vector of the entire image can be determined to sort valid motion vectors into motion vectors which match the determined motion vector of the entire image and those which do not match it. A vector which matches the motion vector of the entire image detects only camera shake. A vector which does not match the motion vector of the entire image detects the motion of an object at the same time as camera shake. FIG. 3D exemplifies this. ⊚ represents a motion vector which matches the motion vector of the entire image, and ○ represents a motion vector which does not match it (x represents an invalid vector, similar to FIG. 3C). In this example, 24 blocks exhibit motion vectors which match the motion vector of the entire image, and four blocks exhibit motion vectors which do not match it.

The ratio of motion vectors evaluated to be valid to the total number of blocks is defined as a valid vector ratio. In the example of FIG. 3C, the valid vector ratio is 70% (=28 blocks/40 blocks). The valid vector ratio represents a calculated ratio of valid motion vectors to all the blocks of image data and a calculated ratio of invalid motion vectors. Thus, the valid vector ratio can be used as an evaluation value for evaluating (detecting) the reliability of the detected motion vector of the entire image.

That is, the reliability evaluation value calculation unit 27 calculates the valid vector ratio as the reliability evaluation value.

The reliability evaluation value can also be obtained by the following method.

As described above, the motion vectors of respective blocks that are determined to be valid (○) in FIG. 3C include motion vectors (⊚ in FIG. 3D) which match the determined motion vector of the entire image, and those (○ in FIG. 3D) which do not match it. The ratio of motion vectors which match the determined motion vector of the entire image, to all blocks (in the example of FIG. 3D, 24 blocks/40 blocks=60%) can be defined as the reliability evaluation value. The ratio of motion vectors which match the determined motion vector of the entire image, to valid vectors (in the example of FIG. 3D, 24 blocks/28 blocks=86%) can also be defined as the reliability evaluation value.

A motion vector reduction method by the correction amount reduction circuit 24 will be explained.

The correction amount reduction method by the correction amount reduction circuit 24 in the first embodiment determines the reduction rate on the basis of the motion vector reliability evaluation value calculated by the reliability evaluation value calculation unit 27. More specifically, the correction amount reduction circuit 24 determines the reduction rate on the basis of the reliability evaluation value input from the reliability evaluation value calculation unit 27 in accordance with a conversion table for the reduction rate with respect to the reliability evaluation value that is prepared in a memory in advance.

In principle, when the reliability evaluation value is large, the valid vector ratio is high, and the motion vector reliability is determined to be high, decreasing the reduction rate. In other words, the correction gain corresponding to the motion vector is set high.

To the contrary, when the reliability evaluation value is small, the motion vector reliability is determined to be low, increasing the reduction rate. In other words, the correction gain corresponding to the motion vector is set low. The correction gain and reduction rate have a trade-off relationship. For example, when the reduction rate is 20%, the correction gain is 80%. In practice, therefore, the correction amount reduction circuit 24 reduces the correction amount by multiplying, by a determined correction gain, a correction amount converted into the angle unit by the pixel-angle conversion circuit 23.

FIGS. 4A to 4F are graphs showing the correction gain value with respect to the reliability evaluation value. The X-axis represents the reliability evaluation value calculated by the reliability evaluation value calculation unit 27. The reliability evaluation value gradually decreases from 100% to 0% in the positive direction. The Y-axis represents the correction gain with respect to the input correction amount. At least one of conversion tables corresponding to the graphs of FIGS. 4B to 4F is selected and stored in a memory (not shown), and if necessary, loaded into the correction amount reduction circuit 24.

Figure 4A:
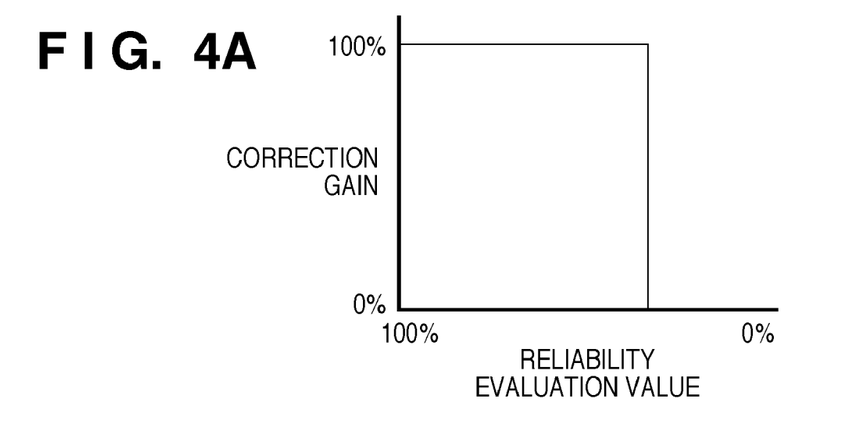
FIG. 4A is a graph showing the correction gain value with respect to the reliability evaluation value according to the first embodiment of the present invention.

For example, if whether or not to execute blurring correction is switched simply depending on whether the reliability evaluation value is larger than a predetermined threshold, as shown in FIG. 4A, the presence and absence of the blurring correction effect digitally switch, and the user feels that image blurring is unnatural. Thus, this correction gain setting is not preferable. According to the first embodiment, the correction gain is continuously reduced with respect to a change of the reliability evaluation value, as shown in FIGS. 4B to 4F. The change of the blurring correction effect is made smooth, preventing the user from feeling that image blurring is unnatural.

Figure 4B:
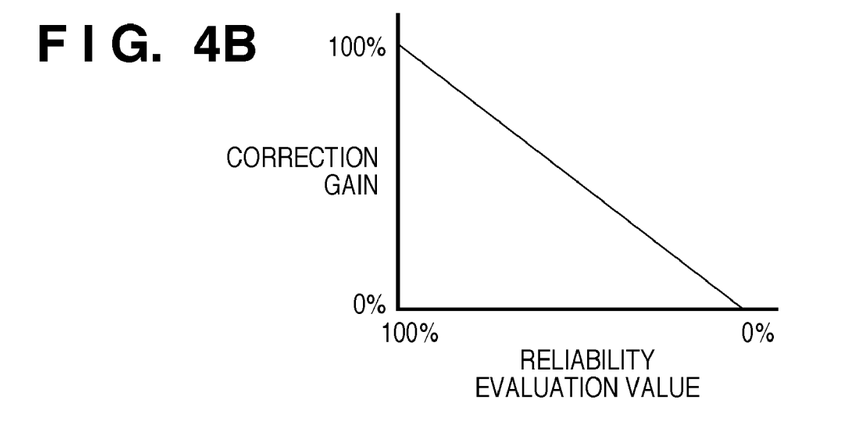
FIG. 4B is a graph showing the correction gain value with respect to the reliability evaluation value according to the first embodiment of the present invention.

A correction gain G having a characteristic shown in FIG. 4B with respect to an input correction amount is given by $$G=E \quad (1)$$

where E is the reliability evaluation value.

Figure 4C:
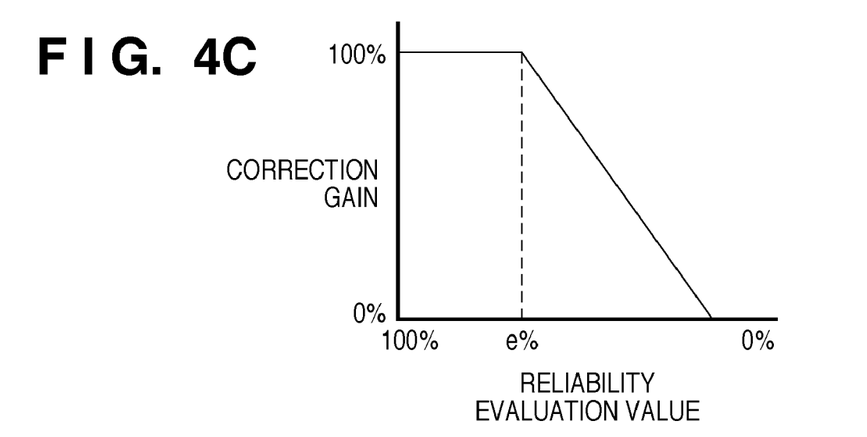
FIG. 4C is a graph showing the correction gain value with respect to the reliability evaluation value according to the first embodiment of the present invention.

Blurring correction does not unnaturally switch unless the reduction rate abruptly changes. Thus, the correction gain may also decrease from a point at which the reliability evaluation value reaches a predetermined value, as shown in FIG. 4C. The correction gain having this characteristic is given by $$G=E/e: (\text{for } E<e)$$

$$G=100: (\text{for } E>e) \quad (2)$$

Figure 4D:
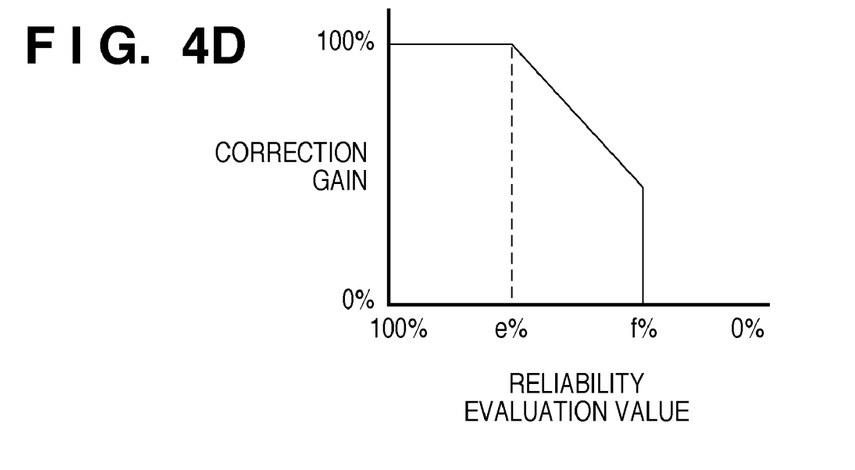
FIG. 4D is a graph showing the correction gain value with respect to the reliability evaluation value according to the first embodiment of the present invention.

When the reliability evaluation value is small, unnaturalness arising from incomplete camera shake correction is not sensed as long as the correction gain is also sufficiently low even if discontinuity still remains. In this case, unnaturalness arising from incomplete camera shake correction can be reduced by reducing discontinuity before and after a point where the reliability evaluation value reaches e % in FIG. 4C. For this reason, it is also possible to set the correction gain high up to a point of f %, and to 0 when the reliability evaluation value is f % or less, as shown in FIG. 4D.

Figure 4E:
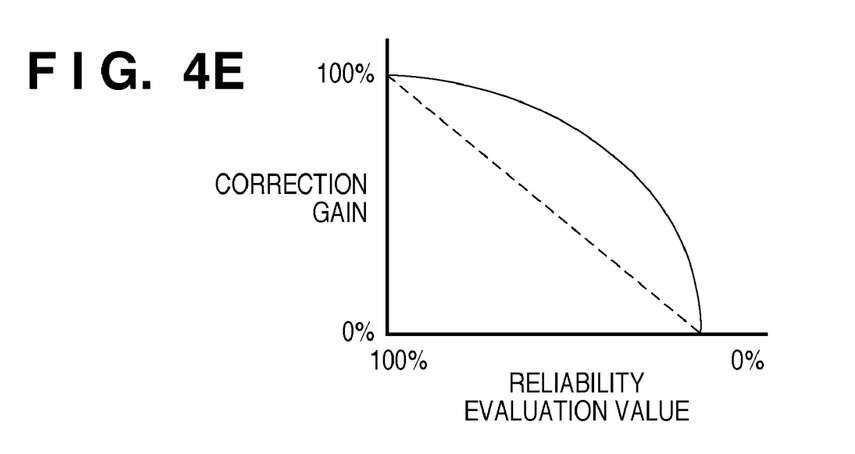
FIG. 4E is a graph showing the correction gain value with respect to the reliability evaluation value according to the first embodiment of the present invention.
Figure 4F:
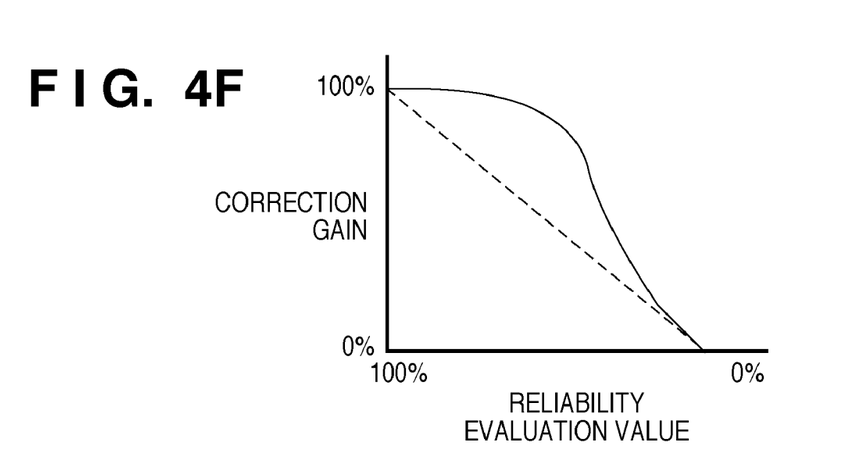
FIG. 4F is a graph showing the correction gain value with respect to the reliability evaluation value according to the first embodiment of the present invention.

In FIG. 4B, the gain changes linearly. Alternatively, the gain may also change along an arc, as shown in FIG. 4E, or change along an S-shaped curve, as shown in FIG. 4F. Changing the correction gain along a curve can set a high correction gain when the reliability evaluation value is large, enhancing the correction effect. The method using curves in FIGS. 4E and 4F is also applicable when changing straight lines in FIGS. 4C and 4D into curves.

As described above, the correction amount is calculated by multiplying an input correction amount by a correction gain based on the reliability evaluation value. This can eliminate the discontinuity of blurring correction upon switching between execution and non-execution. As a result, the user hardly feels that the anti-shake effect of image blurring correction is unnatural.

Second Embodiment

The first embodiment reduces the correction amount on the basis of the motion vector reliability. The second embodiment will describe a method of changing the reduction rate of the correction amount in accordance with the focal length in addition to the motion vector reliability.

An image capturing apparatus according to the second embodiment has the same system configuration as that in FIG. 1 described in the first embodiment, and is different in only the operation. An operation different from that described in the first embodiment will be explained.

A correction amount reduction circuit 24 receives zoom position information from a zoom control circuit 32, obtaining focal length information. The correction amount reduction circuit 24 reduces the correction amount for a detected motion vector in consideration of the focal length information in addition to the motion vector reliability.

A motion vector reduction method by the correction amount reduction circuit 24 in the second embodiment will be explained.

In the second embodiment, the reduction rate increases as the focus moves to the telephoto end. That is, if the reliability evaluation value remains unchanged, the reduction rate of the correction amount increases as the zoom position moves to the telephoto end.

This is because, as the zoom position moves to the telephoto end, the object is zoomed in, the pattern becomes larger than that on the wide-angle end, and it becomes difficult to calculate the correlation between motion vectors. When the focal length reaches a middle position near the midpoint of the zoom range, the reduction rate continuously increases, i.e., the correction gain decreases, reducing the difference in the blurring correction effect depending on the zoom position.

Figure 5:
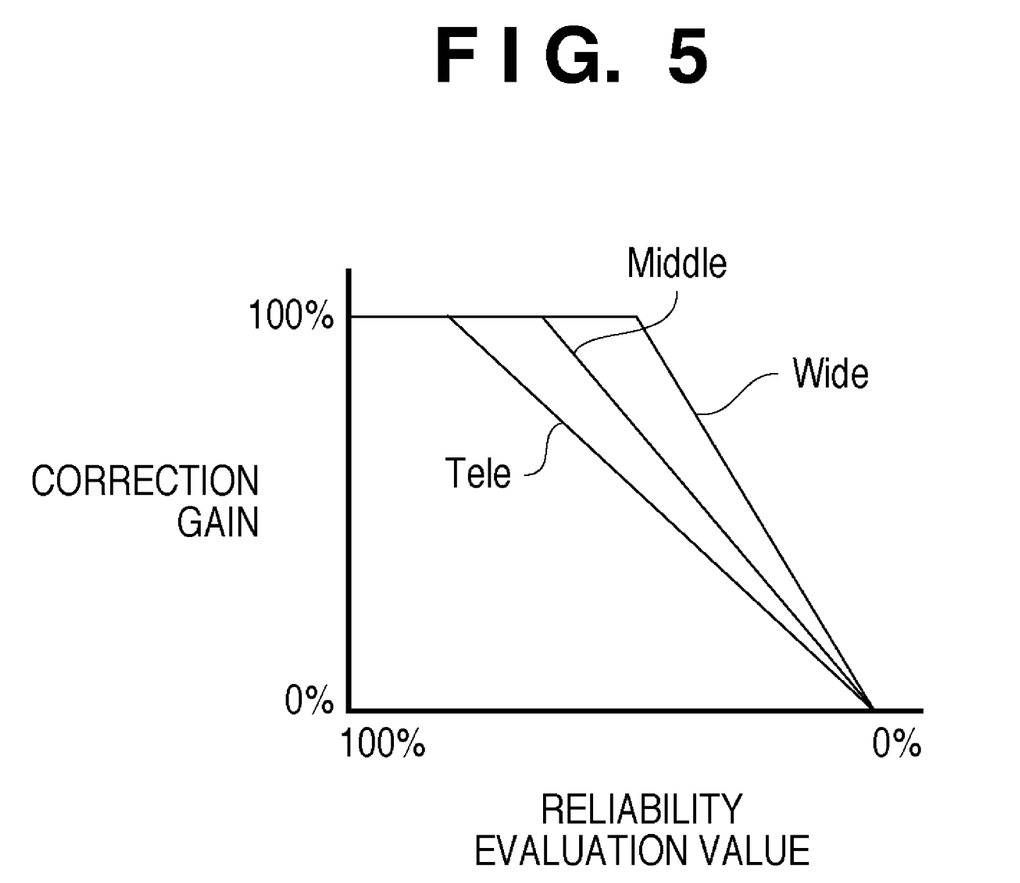
FIG. 5 is a graph showing a change of the correction gain with respect to the reliability evaluation value in accordance with the focal length according to the second embodiment of the present invention.

FIG. 5 is a graph showing a change of the correction gain with respect to the reliability evaluation value in accordance with the focal length.

When the focus exists at the wide-angle end, the correction gain starts decreasing at a small reliability evaluation value. When the focus exists at the telephoto end, the correction gain starts decreasing at a reliability evaluation value larger than that in the case where the focus exists at the wide-angle end.

A conversion table corresponding to the graph of FIG. 5 is stored in a memory (not shown), and if necessary, loaded into the correction amount reduction circuit 24.

As described above, the correction gain is determined for an input correction amount on the basis of the reliability evaluation value and focal length. This can eliminate the discontinuity of blurring correction upon switching between execution and non-execution depending on the motion vector reliability and the difference in focal length. As a result, the user hardly feels that the anti-shake effect of image blurring correction is unnatural.

Other Embodiments

The object of the embodiments is also achieved by the following method. More specifically, a storage medium (or recording medium) which stores the program codes of software for implementing the functions of the above-described embodiments is supplied to a system or apparatus. The computer (or the CPU or MPU) of the system or apparatus reads out and executes the program codes stored in the storage medium. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

Further, the present invention includes the following case. More specifically, the program codes read out from the storage medium are written in the memory of a function expansion card inserted into the computer or the memory of a function expansion unit connected to the computer. Then, the CPU of the function expansion card or function expansion unit performs part or all of actual processing on the basis of the instructions of the program codes, thereby implementing the functions of the above-described embodiments.

When the present invention is applied to the storage medium, the storage medium stores program codes corresponding to the above-described sequences.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-322545, filed Dec. 13, 2007, which is hereby incorporated by reference herein in its entirety.

What is claimed is:

1. An image capturing apparatus comprising:
   an image capturing unit which captures an object image formed by an imaging optical system and outputs an image signal;
   a motion vector detection unit which detects a local motion vector on the basis of correlation between image signals continuously captured by said image capturing unit;
   a motion vector determination unit configured to determine a motion vector of an entire image based on the detected motion vectors;
   a reliability evaluation value calculation unit which determines whether every local motion vector is valid or invalid, and which calculates a reliability evaluation value of the motion vector of the entire image based on the valid local motion vectors;
   a reduction rate determination unit configured to determine a reduction rate based on the reliability evaluation value;
   a blurring correction amount determination unit configured to determine an image blurring correction amount by correcting a correction amount calculated based on the motion vector of the entire image, based on the reduction rate and
   a blurring correction unit which corrects image blurring on the basis of the image blurring correction amount.

2. The apparatus according to claim 1, wherein a frame of said image capturing unit is divided into a plurality of blocks, said motion vector detection unit detects a motion vector of each divided block as the local motion vector, and said reliability evaluation value calculation unit calculates, as the reliability evaluation value of the motion vector, a ratio of local motion vectors determined to be valid to local motion vectors of all blocks.

3. The apparatus according to claim 1, wherein said reduction rate determination unit decreases reduction of the image blurring correction amount as the reliability evaluation value is larger.

4. An image capturing apparatus comprising:
   an image capturing unit which captures an object image formed by an imaging optical system capable of zooming, and outputs an image signal;
   a motion vector detection unit which detects local motion vectors on the basis of correlation between image signals continuously captured by said image capturing unit;
   a motion vector determination unit configured to determine a motion vector of an entire image based on the detected motion vectors;
   a reliability evaluation value calculation unit which determines whether every local motion vector is valid or invalid, and which calculates a reliability evaluation value of the motion vector of the entire image based on the valid local motion vectors;
   a reduction rate determination unit configured to determine a reduction rate based on the reliability evaluation value and a zoom position of the imaging optical system;
   a blurring correction amount determination unit configured to determine an image blurring correction amount by correcting a correction amount calculated based on the motion vector of the entire image, based on the reduction rate; and
   a blurring correction unit which corrects image blurring on the basis of the image blurring correction amount.

5. The apparatus according to claim 4, wherein a frame of said image capturing unit is divided into a plurality of blocks, said motion vector detection unit detects a motion vector of each divided block as the local motion vector, and said reliability evaluation value calculation unit calculates, as the reliability evaluation value of the motion vector, a ratio of local motion vectors determined to be valid to local motion vectors of all blocks.

6. The apparatus according to claim 4, wherein said reduction rate determination unit decreases the reduction rate as the reliability evaluation value is larger.

7. The apparatus according to claim 4, wherein when the reliability evaluation value remains unchanged, said reduction rate determination unit increases the reduction rate as the zoom position of the imaging optical system comes close to a telephoto end.

8. A method of controlling an image capturing apparatus having an image capturing unit which captures an object image formed by an imaging optical system and outputs an image signal, the method comprising:
   detecting local motion vector on the basis of correlation between image signals continuously captured by the image capturing unit;
   determining a motion vector of an entire image based on the detected motion vectors;
   determining whether every motion vector is valid or invalid;
   calculating a reliability evaluation value of the motion vector of the entire image based on the valid local motion vectors;
   determining a reduction rate based on the reliability evaluation value;
   determining an image blurring correction amount by correcting a correction amount calculated based on the motion vector of the entire image, based on the reduction rate; and
   correcting image blurring on the basis of the image blurring correction amount.

9. A method of controlling an image capturing apparatus having an image capturing unit which captures an object image formed by an imaging optical system capable of zooming, and outputs an image signal, the method comprising:
   detecting local motion vectors on the basis of correlation between image signals continuously captured by the image capturing unit;
   determining a motion vector of an entire image based on the detected motion vectors;
   determining whether every local motion vector is valid or invalid;
   calculating a reliability evaluation value of the motion vector of the entire image based on both the valid local motion vectors;
   determining a reduction rate based on the reliability evaluation value and a zoom position of the imaging optical system;
   determining an image blurring correction amount by correcting a correction amount calculated based on the motion vector of the entire image, based on the reduction rate; and
   correcting image blurring on the basis of the image blurring correction amount.

10. A non-transitory storage medium storing a program which causes a computer to execute a control method defined in claim 8.

11. A non-transitory storage medium storing a program which causes a computer to execute a control method defined in claim 9.

12. An image capturing apparatus comprising:
an image capturing unit which captures an object image formed by an imaging optical system and outputs an image signal;
a motion vector detection unit which detects a motion vector on the basis of correlation between image signals continuously captured by said image capturing unit;
a reliability evaluation value calculation unit which calculates a reliability evaluation value of the motion vector;
a blurring correction amount determination unit which determines an image blurring correction amount on the basis of the motion vector;
a correction amount changing unit which changes the image blurring correction amount in accordance with an amplification rate determined based on the reliability evaluation value, wherein the correction amount changing unit changes the image blurring correction amount such that the image blurring correction amount becomes small as the reliability evaluation value becomes small; and
a blurring correction unit which corrects image blurring on the basis of the image blurring correction amount.

13. The apparatus according to claim 12,
wherein the amplification rate also determines based on a zoom position of the imaging optical system,
wherein the correction amount changing unit changes the image blurring correction amount such that the blurring correction amount becomes small as the zoom position of the imaging optical system becomes telephoto side.

14. The apparatus according to claim 12, wherein a frame of said image capturing unit is divided into a plurality of blocks, said motion vector detection unit detects a motion vector of each divided block, and said reliability evaluation value calculation unit calculates, as the reliability evaluation value of the motion vector, a ratio of motion vectors determined to be valid to motion vectors of all blocks that are detected by said motion vector detection unit.

* * * * *